Sept. 24, 1946.  J. K. HODNETTE  2,408,211

ELECTRICAL INDUCTION APPARATUS

Filed Feb. 5, 1941  3 Sheets-Sheet 1

WITNESSES:
Wm. B. Sellers
Wm. C. Groome

INVENTOR
John K. Hodnette.
BY
Franklin E. Hardy
ATTORNEY

Sept. 24, 1946.  J. K. HODNETTE  2,408,211
ELECTRICAL INDUCTION APPARATUS
Filed Feb. 5, 1941  3 Sheets-Sheet 2
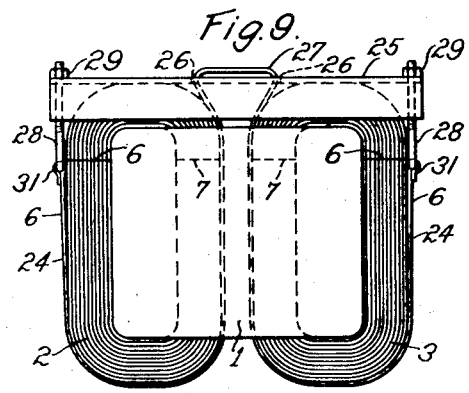
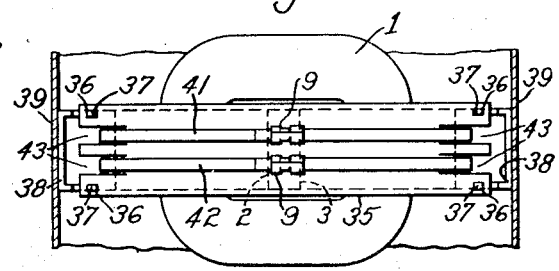
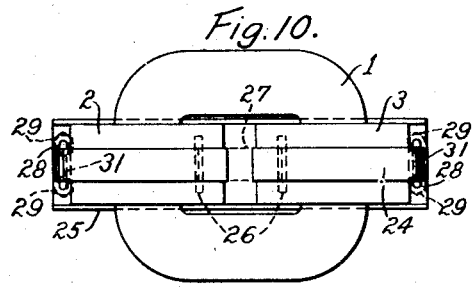
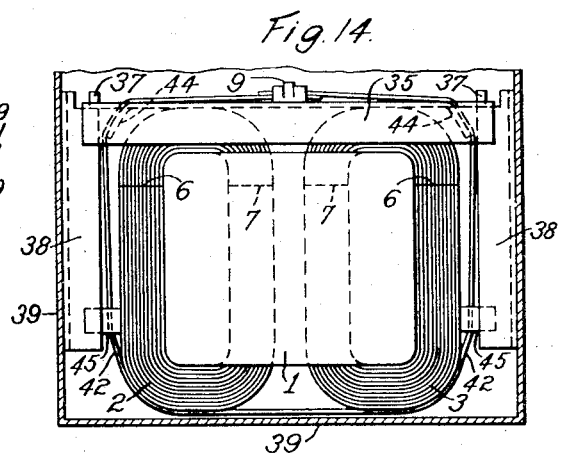
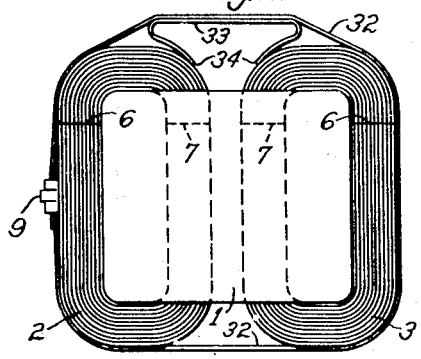
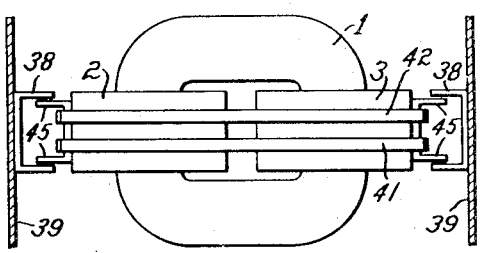
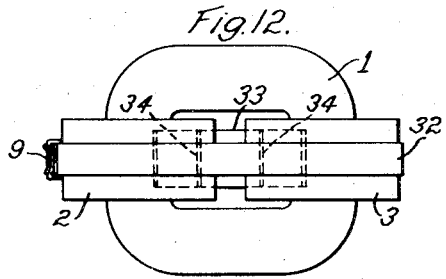
INVENTOR
John K. Hodnette.
BY Franklin E. Hardy
ATTORNEY Sept. 24, 1946.  J. K. HODNETTE  2,408,211
ELECTRICAL INDUCTION APPARATUS
Filed Feb. 5, 1941  3 Sheets-Sheet 3
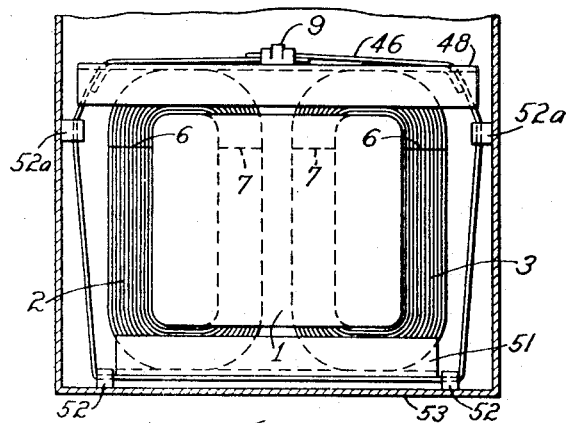
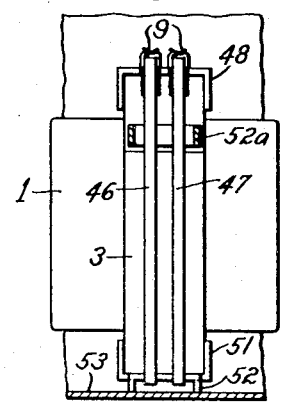
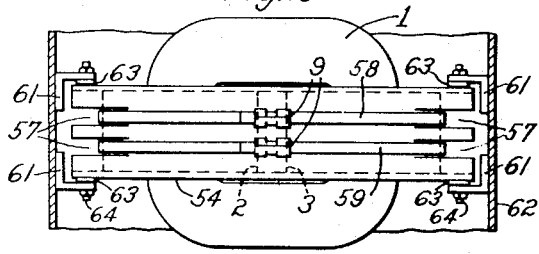
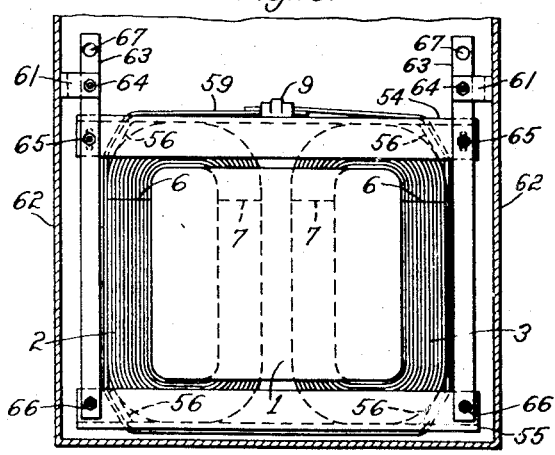
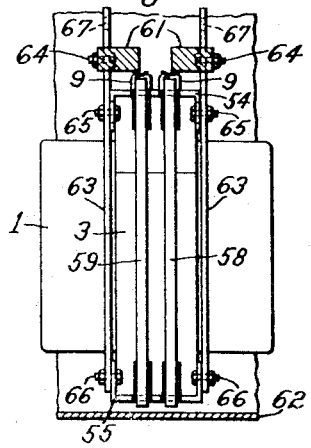
WITNESSES:
INVENTOR
John K. Hodnette.
BY
Franklin E. Hardy
ATTORNEY Patented Sept. 24, 1946

2,408,211

UNITED STATES PATENT OFFICE 2,408,211

ELECTRICAL INDUCTION APPARATUS

John K. Hodnette, Sharon, Pa., assignor to Westinghouse Electric Corporation, East Pittsburgh, Pa., a corporation of Pennsylvania Application February 5, 1941, Serial No. 377,472

11 Claims. (Cl. 175—356)

My invention relates to electrical induction apparatus, such as transformers, and particularly to the core or magnetic circuit structure thereof.

Many commercial grades of silicon steel have slightly better magnetic properties in the direction of rolling than in a direction at an angle to the direction of rolling. That is, when the lines of magnetic flux pass through the steel substantially in the direction of rolling, the core loss is less and the permeability of the steel is higher than when the lines of magnetic flux pass at an angle to the direction of rolling, and these properties are poorest when the lines of magnetic flux are substantially perpendicular to the direction of rolling.

Recent research in magnetic sheet steel has resulted in the development of cold-rolled steels such as Hipersil, having preferred orientation of the axis of easiest magnetization of the crystal grains of the material in the direction of rolling. The permeability of cold-rolled steel having a preferred orientation of the grains in the direction of rolling is considerably higher at operating densities, say 13 to 20 kilogausses, than the permeability of commercial grades of hot-rolled silicon steel at the same densities. Likewise the watts loss per unit volume or unit weight, at operating densities, is lower than for commercial grades of hot-rolled silicon steel at the same density when magnetized in the direction of rolling.

It will be seen, therefore, that if a core is formed of a ribbon of sheet steel having preferred orientation of the grains in the direction of rolling of the strip, that is, in the direction in which the lines of magnetic flux pass through the strip, a core having high permeability and low watts loss will result. The loops of magnetic material comprising the core may be made up by winding a continuous strip of material flatwise to give the desired dimensions, the loop being cut to provide butt joints at suitable places to form separable core sections that fit over the copper windings as described in my now abandoned copending application, Serial No. 254,612, filed February 4, 1939, for Induction apparatus, and assigned to the same assignee as this application.

In that application a core structure is disclosed that is formed of successive layers of magnetic sheet material wound flatwise layer upon layer and bonded together by filling the successive layers or turns of magnetic material with bonding or filling material, thereby providing a solid or non-yielding laminated structure having a film interlayer bond for all portions of the layers of sheet steel, which is beneficial in producing a true cut surface forming the face of the butt joints.

When the steel ribbon forming the core is so wound layer upon layer, the layers bonded together to form a solid loop structure is cut into separate upper and lower sections. The laminations of the resulting separable sections are held together as a solid mass so that there is no vibration or relative movement of the layers.

It has been found desirable to work the meeting faces between the separable core sections in order to provide smooth flat surfaces at the butt joint that are adapted to join and provide a minimum air gap. It has also been found desirable to insulate the magnetic material between the separable sections of the core meeting at the butt joints. Material suitable for this purpose may be one of the combination of long chain molecules of the alvar or vinalite type, or other oil and acid resisting resins such as described in the copending application of H. V. Putman, Serial No. 353,024, filed August 17, 1940, for Core structures, and assigned to the same assignee as this application. These materials are somewhat thermoplastic and have the property of tenaciously adhering to the metal surfaces. It is necessary to bring the core faces together under pressure to reduce the thermoplastic material to the predetermined thinness.

It has been found that transformer cores formed of wound loops of magnetic material cut to provide butt joints as above described are sensitive to changes in pressure and if the pressure is not applied perpendicular to the face of the joint the watts loss of the core increases somewhat with increase in pressure. For example, if the core sections are clamped together in such manner that the surfaces of the butt joints are not parallel, localized strains will be set up in the core structure which will increase the loss. It has been found that the best results are obtained by providing pressure at the joint perpendicular to the worked faces of the laminations such as is supplied by the metal bands applied as herein disclosed. When the separable sections of such cores are held together by means of metal bands as described in this application, the bands provide for drawing the worked faces toward one another to reduce the thickness of the thermoplastic material between them. These bands are elastic and are applied under sufficient tension and elongation to maintain the desired pressure after the worked faces are drawn together, and in spite of the slight contraction of the band that may be caused by any flowing of the insulating material in the butt joint due to its plastic nature.

It is an object of this invention to provide a core structure of the above-indicated character in which the core parts are held together by means of metal bands that are sufficiently elastic and are sufficiently elongated as to provide a continuous force to the parts of the core in spite of shrinkage of the overall dimension thereof.

It is another object of the invention to provide not only for securing a continuous pressure on the core sections adjacent the butt joint, but also to maintain the assembly of various transformer parts and in securing the assembly in the tank or casing.

Other objects and advantages of the invention will be apparent from the following description of preferred embodiments thereof, reference being had to the accompanying drawings in which:

Figs. 9 and 10 are side elevational and bottom views of an assembly having a reentrant loop of the band between the core parts and in which provision is made for adjusting the pressure applied to the bands.

Figs. 11 and 12 illustrate side elevational and bottom views, respectively, of an assembly in which a band extends continuously around the outside of the core structure and a resilient member is provided beneath the band.

Figs. 13, 14 and 15 illustrate top, side elevational, and bottom views, respectively, of an assembly in which the metal bands, in addition to holding the core sections under pressure, also hold the top end frame and guide channels to the core structure.

Figs. 16 and 17 are a side elevational and end elevational view of an assembly in which the metal bands, in addition to applying pressure to the core sections, also hold the end frames in place on the core and lock the core and coil assembly to the transformer tank.

Figs. 18, 19 and 20 illustrate top, side elevational and end elevational views of an assembly arranged in such manner that the metal straps do not carry the weight of the core in lifting the structure from the tank.

Figs. 21 and 22 are side and edge views of band couplings showing the manner of fastening the ends of the steel bands used in the several core and coil assemblies; and Fig. 23 is an enlarged sectional view taken on the line XXIII—XXIII.

Figure 1:
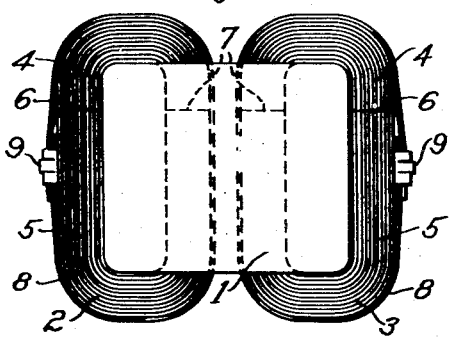
Figures 1 and 2 are side elevational and bottom views, respectively, of a core and coil assembly comprising one embodiment of the invention in which a separate metal band is applied to each half of the core structure comprising two core loops.
Figure 2:
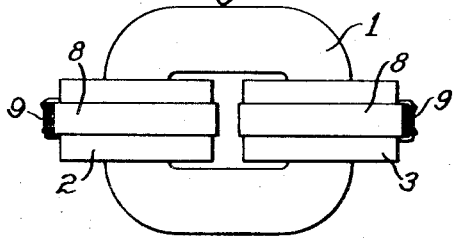

Referring to the embodiment of the invention illustrated in Figs. 1 and 2, a coil structure 1 is illustrated which may comprise a plurality of primary and secondary coils arranged in a well known manner in the winding space outlined in the drawings and about which two core loops or magnetic circuits 2 and 3 are positioned, each loop comprising an upper section 4 and a lower section 5. The core loops are formed by winding a continuous strip of magnetic material as above described which material is cut at joints 6 and 7 to form the upper and lower core sections 4 and 5 that may be suitably assembled about the coil structure. After the faces of the upper and lower sections 4 and 5 have been worked in the manner above described, the thermoplastic resin is applied to the faces which meet to form the butt joints at 6 and 7 when these sections are assembled about the coil structure as above described, and a banding or clamping strap 8 is applied to each of the core loops extending thereabout and stretched by means of a tool which attaches the ends of the straps to form a coupling 9 while the strap is under tension. The coupling 9 is shown in greater detail in Figs. 21 and 22 in which opposite ends 11 and 12 of the strap are shown extending through a sleeve 13 which is crimped in the manner shown to force portions 14 of the outer edges of the sleeve 13, together with associated portions of the outer edges of the ends 11 and 12 of the banding strap are bent or crimped together so as to form a firm coupling. The crimping of the sleeve 13 and the sides of the strap is done while the strap is under a considerable tensile force. The structure is placed in an oven for drying it, and as it is heated, it flows out to a limited extent, thus decreasing the pressure between the faces of the joint. The banding strap is stretched a sufficient amount, when applied, and has sufficient elasticity to maintain the desired pressure on the joints 6 and 7, even though the resin material flows. Stresses of the order of 25,000 pounds per square inch are developed in the banding strap 8. It has been found that stresses of this order in the banding strap will satisfactorily take care of the change caused by the flowing of the material in the joints 6 and 7 and still maintain satisfactory pressure. Films of the order of .00025 inch in thickness have been found to provide a satisfactory insulating film and to protect the worked edges of the core sections 4 and 5 from any acid in the dielectric liquid in which the core and coil assembly operates when assembled in its casing. In this embodiment of the invention the bands extend through the coils and are in the magnetic circuit, but can be made sufficiently thin to prevent undue magnetic loss in the bands if a plain steel band is used. To eliminate or minimize such magnetizing loss, the bands can be made of mill annealed silicon steel or some non-magnetic material.

Figure 3:
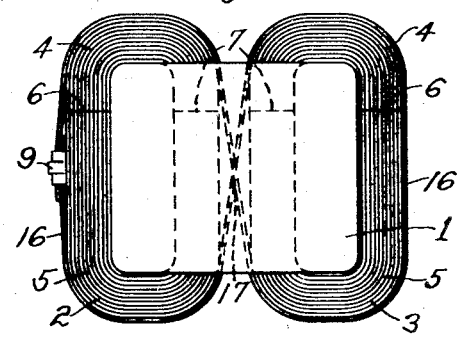
Figs. 3 and 4 are side elevational and bottom views, respectively, of a core and coil assembly in which a single band is employed in the form of a figure eight about both core loops.
Figure 4:
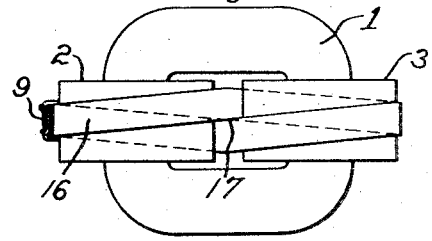

The embodiment of the invention illustrated in Figs. 3 and 4 shows a banding strap or resilient band 16 that is continuous about the two core loops 2 and 3 and crosses in the space between them at 17 forming a figure eight.

Figure 5:
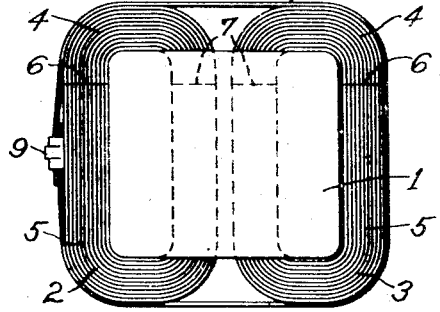
Figs. 5 and 6 are side elevational and bottom views, respectively, of a core and coil assembly in which a single band is employed around the outside of both core loops.
Figure 6:
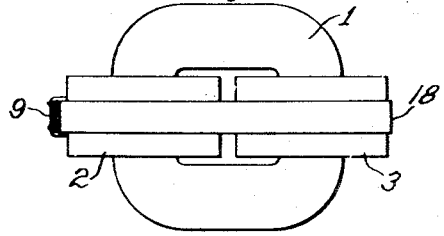

In the form of the invention shown in Figs. 5 and 6 a single band 18 or clamping strap extends about the two core loops. With this construction the band does not pass through the electrical coil and the iron losses in it will therefore be reduced to a minimum. In the form of the invention illustrated in Figs. 7 and 8, a single continuous band 21 is provided which passes up between the two core loops 2 and 3, as shown at 22, and about a pressure member 23 so as to provide pressure on both the inside and the outside of the magnetic circuit structures 2 and 3. This form of the invention couples the advantages of the single band, as in the form illustrated in Figs. 5 and 6, together with the advantages of applying the banding strap close to the inside as well as the outside of the core loops, as in Fig. 1.

Figure 7:
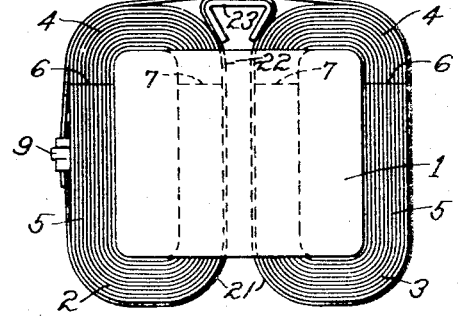
Figs. 7 and 8 are elevational and bottom views, respectively, of an assembly in which a pressure member is employed adjacent the ends of the core loops to provide a reentrant loop of the band between the core loops to bring pressure on both the inside and outside of the loops forming the magnetic circuit.
Figure 8:
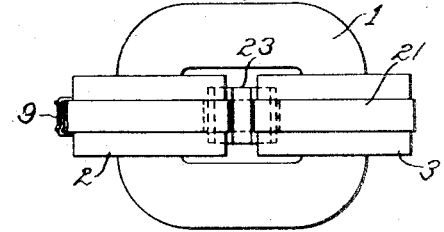

The form of the invention illustrated in Figs. 9 and 10 is similar to that shown in Figs. 7 and 8 to the extent that the clamping strap or metal band 24 is continuous along the outside of the core loops 2 and 3 and along the inner surfaces thereof so as to bring pressure on both the outside and the inside of the loops. In this form of the invention a channel-shaped end frame 25 is provided having slots 26 therein through which the middle portion 27 of the band extends to form the center reentrant loop. Adjustable bolt members 28 provided with nuts 29 extend through the ends of the end frame 25 and are attached at 31 to the ends of the banding material thus permitting adjustment of the banding material after assembly.

In Figs. 11 and 12 a single band 32 is provided extending about both loops in a manner generally similar in the form of invention shown in Figs. 5 and 6, but including a resilient spring member 33, the ends 34 of which are positioned against the two inner corners at one end of the loops of magnetic material 2 and 3 so as to apply pressure to the center legs of the magnetic structure.

The form of the invention shown in Figs. 13, 14 and 15 provides an upper channel-shaped end plate 35 having openings 36 adjacent the corners thereof for accommodating projections 37 shown extending upwardly from channel-shaped guide members 38 attached to opposite sides of the wall of the tank 39 in which the apparatus is positioned. As best shown in Figs. 13 and 15, two banding straps 41 and 42 are provided passing through slots 43 formed in the ends of the channel-shaped end frame member 35 formed by cutting and bending portions 44 thereof downwardly as best shown in Fig. 14. The banding members 42 and 41 also attach channel-shaped guide members 45 to the core which cooperate with the guide members 38 on the tank walls for centering the apparatus while it is being lowered and after it has been lowered to its position within the tank 39.

In the form of invention shown in Figs. 16 and 17 straps of banding material 46 and 47 are provided extending through slots in the end of an end frame member 48 that is similar to the end frame member 45 shown in Figs. 13, 14 and 15. In this form of the invention, however, a lower channel-shaped end frame member 51 is also provided, the outer sides of which extend upwardly on opposite faces of the core loops 2 and 3. Lugs 52 are provided on the bottom of the tank 53 and similar lugs 52a are provided on the side walls of the tank. The bands 46 and 47 are shown extending about the core structure above and below the end frame members 48 and 51, respectively, and through the lugs 52 and 52a on the bottom and side walls of the tank, respectively, to lock the structure in position within the tank 53.

In the form of the invention illustrated in Figs. 18, 19 and 20, an upper end frame 54 and a lower end frame 55 are provided each having projections 56 extending inwardly toward the core to provide slots 57 for accommodating the banding straps 58 and 59. In this form of the invention, however, the banding straps are not employed to directly attach the structure to lugs within the wall of the tank as in Figs. 16 and 17, nor do the banding straps carry the weight of the structure when raised from the tank as in many of the other forms illustrated. Instead of the previously described construction, holding lugs 61 are provided attached to the wall of the transformer tank 62 and to which lifting lugs 63 are attached by means of bolts 64. The lifting lugs extend downwardly from the holding lugs and are attached to the upper end frame member 54 by means of bolts 65 and to the lower end frame member 55 by means of bolts 66, thus forming a rigid frame structure about the core. This assembly may be removed from the tank as a unit by means of the opening 67 at the upper end of the lifting lugs.

It will be noted that in the several structures illustrated the metal bands about the core parts are effective at all times to apply pressure to the butt joints between the core sections comprising the core loops of the magnetic circuit structure, and in many of the modifications illustrated to perform additional duty, such as to attach the structure within its casing, or to attach additional parts of the apparatus, such as guide members, or end frames, to the core structure.

It will be understood by those skilled in the art that modifications may be made in the details of the structures illustrated and described without departing from the spirit of my invention and I do not wish to be limited otherwise than by the scope of the attached claims.

I claim as my invention:

1. In a magnetic structure for electrical apparatus, a plurality of core loops each formed from a ribbon of magnetic sheet steel wound flatwise layer upon layer and having a substantially rectangular window therein, the several layers being bonded together to form a solid mass, smooth butt joints on opposite sides of the rectangular loops to provide separable sections, and a resilient band of metal about the core loops under constant tension for maintaining a constant pressure on said butt joints.

2. In a magnetic structure for electrical apparatus, a plurality of core loops each formed from a ribbon of magnetic sheet steel wound flatwise layer upon layer and having a substantially rectangular window therein, the several layers being bonded together to form a solid mass, and a resilient band of steel about the core loops under constant tension for maintaining a constant pressure thereon.

3. In a magnetic structure for electrical apparatus, a plurality of core loops each formed from a ribbon of magnetic sheet steel wound flatwise layer upon layer, bonding material between the successive layers of magnetic sheet steel to hold the layers in a solid structure, said loops being provided with smooth butt joints on opposite sides of the loops to provide separable sections, a thermoplastic material disposed between the faces of the butt joint, and a resilient band of metal under tension about each of the core loops for maintaining a constant pressure on the core sections.

4. In a magnetic structure for electrical apparatus, a pair of core loops each formed from a ribbon of magnetic sheet steel wound flatwise and positioned with their front and rear faces in corresponding planes, layers of bonding material between the successive layers of magnetic material forming a loop to hold the layers in a solid laminated structure, said loops being provided with smooth butt joints on opposite sides thereof to provide separable sections, a thermoplastic material disposed between the faces of the butt joint, and a resilient band of metal under tension about the edges of the pair of loops for maintaining the core sections in position and a substantially constant pressure on said butt joints.

5. In a magnetic structure for electrical apparatus, a core loop formed from a ribbon of magnetic sheet steel wound flatwise layer upon layer and having a substantially rectangular window therein, the several layers being bonded together to form a solid mass, smooth butt joints on opposite sides of the rectangular loop to provide separable sections, and a resilient band of metal about the core under constant tension for maintaining a constant pressure on said butt joints.

6. In a magnetic structure for electrical apparatus, a core formed from a ribbon of magnetic sheet steel wound flatwise, layers of doubly adherent bonding material between the successive turns of magnetic material to hold the layers of steel in a solid laminated structure, said loop being provided with smooth butt joints on opposite sides thereof, and a resilient band of steel about the core under constant tension for maintaining a constant pressure thereon.

7. In a magnetic structure for electrical apparatus, a core comprising a plurality of loops each formed from a ribbon of magnetic sheet steel wound flatwise layer upon layer, the several layers being bonded together to form a solid mass, and provided with smooth butt joints on opposite sides of the loops to provide separable sections, and a separate resilient band of metal under tension about each of the core loops for maintaining a constant pressure on the core sections.

8. In a magnetic structure for electrical apparatus, a core loop formed from a ribbon of magnetic sheet steel wound flatwise, layers of doubly adherent bonding material between the successive turns of magnetic material to hold the layers of steel in a solid laminated structure, said loop being provided with smooth butt joints on opposite sides thereof to provide separable sections, and a resilient band of metal under tension about the loop for maintaining the core sections in position and for maintaining a substantially constant pressure on said butt joints.

9. In combination, a casing, a magnetic structure for electrical apparatus within said casing, a plurality of core loops each formed from a ribbon of magnetic sheet steel wound flatwise, layers of doubly adherent bonding material between the successive turns of magnetic material to hold the layers of steel in a solid laminated structure, said loops each being provided with machined smooth butt joints on opposite sides thereof to provide separate sections, a thermoplastic material disposed between the faces of the butt joints, a resilient band of metal under tension about each of said loops for maintaining the parts of the loop in position and for maintaining a substantially constant pressure on said butt joints.

10. In combination, a casing, a magnetic structure for electrical apparatus within said casing comprising a core loop formed from a ribbon of magnetic sheet steel wound flatwise, layers of doubly adherent bonding material between the successive turns of magnetic material to hold the layers of steel in a solid laminated structure, said loop being provided with machined smooth butt joints on opposite sides thereof to provide separable sections, a thermoplastic material disposed between the faces of the butt joints, a resilient band of metal under tension about said loop for maintaining the parts of the loop in position and for maintaining a substantially constant pressure on said butt joints.

11. In a magnetic structure for electrical apparatus, a core loop formed from a ribbon of magnetic sheet steel wound flatwise layer upon layer, layers of doubly adherent bonding material between the successive turns of magnetic material to hold the layers of steel in a solid laminated structure, said loop being provided with machined smooth butt joints on opposite sides thereof to provide separable U-shaped sections, a thermoplastic material disposed between the faces of the butt joints, and a resilient band of metal under tension about said loop for maintaining a substantially constant pressure on said butt joints.

JOHN K. HODNETTE.